April 14, 1925.  1,533,763
J. F. SCHIMEK
ANTIFRICTION DEVICE FOR ECCENTRIC CONNECTIONS
Filed Dec. 30, 1922

Inventor:
Joseph F. Schimek.
By attorney
Owen W. Kennedy

Patented Apr. 14, 1925.

1,533,763

UNITED STATES PATENT OFFICE.

JOSEPH F. SCHIMEK, OF HOLDEN, MASSACHUSETTS, ASSIGNOR TO CASHIKO MACHINE COMPANY, OF WORCESTER, MASSACHUSETTS, A CORPORATION OF MASSACHUSETTS.

ANTIFRICTION DEVICE FOR ECCENTRIC CONNECTIONS.

Application filed December 30, 1922. Serial No. 609,961.

*To all whom it may concern:*

Be it known that I, JOSEPH F. SCHIMEK, a citizen of the United States, residing at Holden, in the county of Worcester and Commonwealth of Massachusetts, have invented a new and useful Improvement in an Antifriction Device for Eccentric Connections, of which the following, together with the accompanying drawings, is a specification.

My invention relates to eccentric connections, and has for its object to provide an improved anti-friction device for an eccentric connection, such as is usually employed to convert the rotative movement of a shaft into the reciprocatory movement of a member constrained to move in a plane extending substantially at right angles to the axis of rotation of the shaft.

A well known form of eccentric connection comprises a circular disk or plate mounted eccentrically with respect to the axis of rotation of the rotating shaft, and a link member or connecting rod having a yoke-shaped portion surrounding the eccentric disk or plate. With such an arrangement, it is obvious that there is always considerable friction between the outer surface of the eccentric disk or plate and the inner surface of the yoke portion which is in engagement therewith and, by my invention, I propose to provide an anti-friction device which is adapted to be embodied in an eccentric connection of the above described type so as to substantially eliminate power losses due to friction. A particular embodiment of my invention is shown in the accompanying drawings, in which—

Like reference characters refer to like parts in the different figures.

Figure 1:
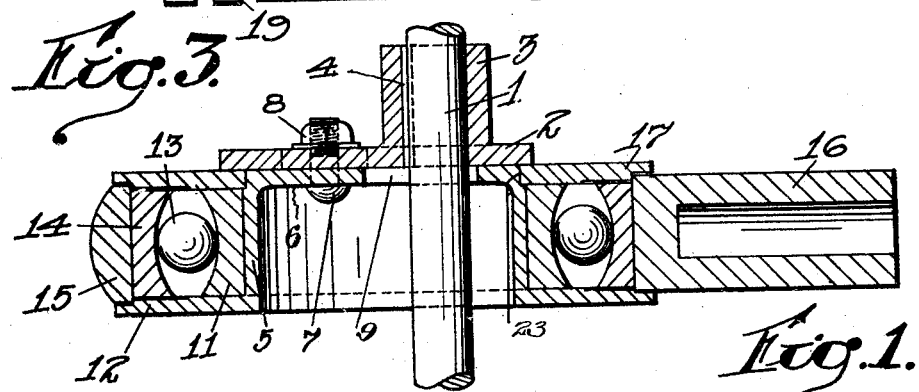
Fig. 1 is a transverse sectional view of an eccentric connection embodying my invention.
Figure 2:
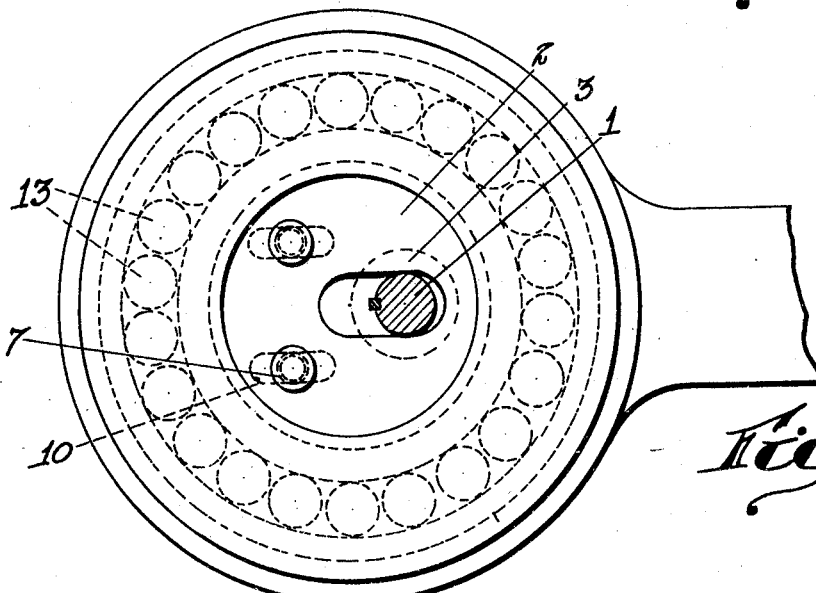
Fig. 2 is a plan view of the parts shown in Fig. 1.

Referring first to Figs. 1 and 2, a rotating shaft 1 has mounted thereon a circular plate or disk 2 which is provided with an eccentrically disposed hub 3, surrounding the shaft 1 and secured thereto by means of a key 4. A bearing container, consisting of a cylindrical portion 5 and a portion 6 parallel to the disk 2, is secured to the disk 2 by means of bolts 7 and nuts 8 coacting therewith. The portion 6 is provided with an eccentric opening 9 considerably larger than the shaft 1, so that the bearing container can be adjusted with respect to the shaft to vary its degree of eccentricity. To this end, the slots 10 in the disk 2, through which the bolts 7 pass, are elongated, as best shown in Fig. 2.

An annular ball race 11 surrounds the cylindrical portion 5 and is maintained in position thereon by means of a flange 12 surrounding the portion 5. A plurality of balls 13 are disposed between ball race 11 and a second ball race 14. The outer ball race 14 fits within a circular yoke 15 provided at one end of a link member 16. The ball races 11 and 14 are retained in position on the bearing container by an annular plate 17 interposed between the eccentric disk 2 and an annular seat 23 provided on the portion 6 of the bearing container.

Figure 3:
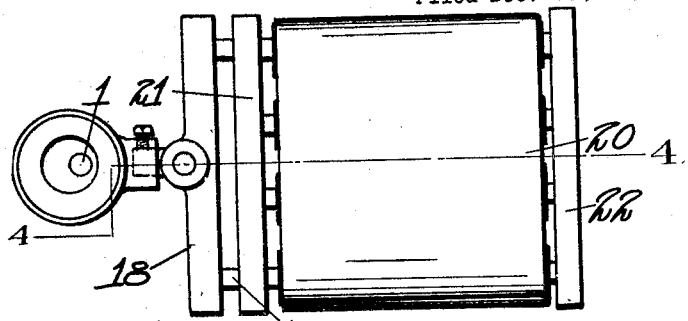
Fig. 3 is a plan view illustrating the application of my invention to an arrangement for driving the rubbing apron of a condensing or rubbing apparatus used in the manufacture of yarn.
Figure 4:
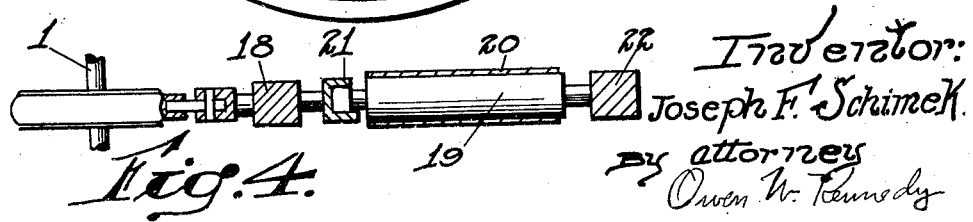
Fig. 4 is a view, partially in side elevation and partially in section, along the line 4—4, Fig. 3.

Referring now to Figs. 3 and 4, there is shown an application of my improved anti-friction device in an eccentric connection for driving the rubbing apron of a condensing machine. The eccentric link 16 is, in this application, connected to a cross member 18, which carries a plurality of shafts 19 upon which is supported a rubbing apron 20. The shafts 19 are rotatably and slidably mounted in stationary brackets 21 and 22, so that, as the shaft 1 rotates, the apron 20 is adapted to be moved back and forth by reason of the eccentric connection between the shaft 1 and the link member 16. The conversion of the rotative movement of the shaft 1 to the reciprocatory movement of the apron 20 is carried out with substantially no frictional losses between the eccentric disk and yoke, owing to the interposition of the balls 13 between these two members. I have found that when a number of eccentric connections are arranged one above the other on the shaft 1, as in a condensing machine, the saving in power accomplished by the use of my improved anti-friction devices is very considerable, and furthermore, that the effectiveness in operation of the machine, as a whole, will be improved, owing to the substantial elimination of lost motion in the eccentric connections due to wearing of the parts.

While I have shown my invention as being embodied in an eccentric connection used in a particular type of machine, it is obvious that it is not so limited in its application, but is capable of being used in other machines. I desire, therefore, that only such limitations be imposed on my invention as may come within the scope of the appended claim.

I claim.

In an anti-friction eccentric device, a plate with a hub eccentrically located thereon, a shaft passing through said hub and keyed thereto, a cylindrical member with a circular flange extending outwardly from one of its bases and a hole eccentrically located therein for the passage of said shaft, said cylindrical member adapted to be secured to said plate, a one-piece collar adapted to cooperate with said flanged cylindrical member to form an outer channel substantially rectangular in cross section, a pair of anti-friction races, anti-friction bodies, and means for locking said cylindrical body and said races together in operative position to enclose said anti-friction bodies.

Dated this 27th day of December, 1922.

JOSEPH F. SCHIMEK.